Nov. 3, 1970    W. HALPERN    3,537,338
COUNTERSINKING TOOL
Filed Oct. 9, 1968
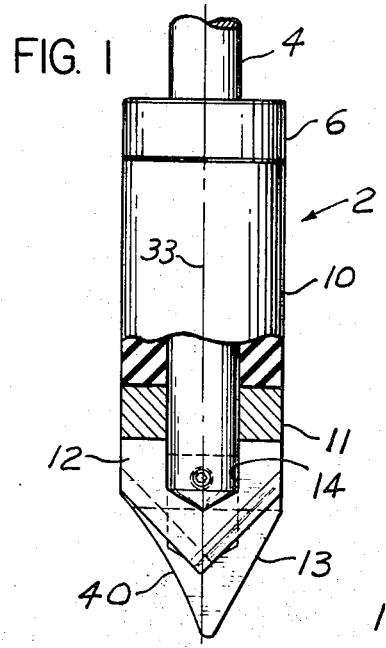
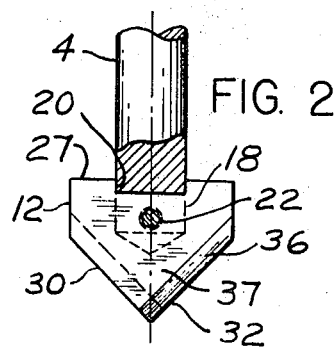
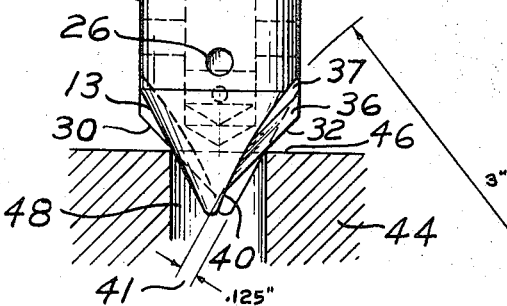
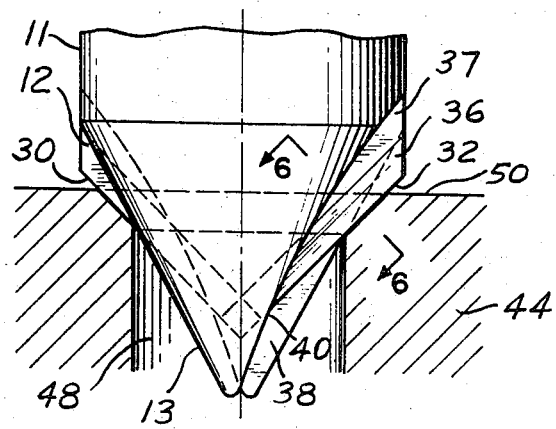
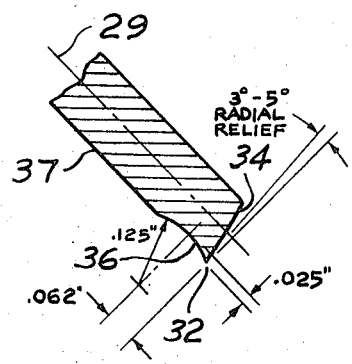
INVENTOR.
WILLIAM HALPERN
BY
Curtis, Morris & Safford
ATTORNEYS

United States Patent Office 3,537,338
Patented Nov. 3, 1970

3,537,338
COUNTERSINKING TOOL
William Halpern, Haviland Road, Harrison, N.Y. 10528
Filed Oct. 9, 1968, Ser. No. 766,151
Int. Cl. B23b *51/10*
U.S. Cl. 77—73.5    8 Claims

ABSTRACT OF THE DISCLOSURE

A countersinking tool is disclosed which has two diametrically spaced cutting edges which balance the cutting operation. The nose cone presents a conical surface which rests in the hole in the workpiece and the cutting edges have adjacent surfaces which cooperate with surfaces on the nose cone to insure the efficient removal of the chips which are cut away.

---

This invention relates to countersinking tools, and more in particular to such a tool having great versatility and utility in countersinking holes of various sizes in metal workpieces.

An object of this invention is to provide an improved tool for countersinking holes in workpieces without the difficulties which have been encountered in the past. Another object is to provide countersinking tools for metal which may be operated with great efficiency and without chattering and other objectionable results. These and other objects will be in part obvious and in part pointed out below.

In the drawings:

FIG. 1 is a side elevation with the lower portion broken away of one embodiment of the invention;

FIG. 2 is a view showing the interconnection between the shank and cutter or bit of FIG. 1;

FIG. 3 is a side elevation of the lower portion of the tool of FIG. 1;

FIG. 4 is a side elevation showing the tool of FIG. 1 engaging a workpiece prior to the initial cutting operation;

FIG. 5 is an enlarged view similar to the lower portion of FIG. 4 and showing the relationship between the tool and the workpiece after the cutting operation has started; and FIG. 6 is a sectional view on the line 6—6 of FIG. 5.

Referring to FIGS. 1 and 3 of the drawings, tool 2 has a shank 4 upon which is rigidly mounted a collar 6 which is held by a set screw 8, a rubber or elastomer cylindrical spring or resilient sleeve 10, a nose cone 11 having a conical surface 13, and a bit or cutter 12. The lower end of shank 4 extends into a cylindrical axial recess 14 in the top of nose cone 1, and cutter 12 is positioned in a diametrical slot 16 extending upwardly from the bottom of the nose cone. The lower end of shank 4 (see FIG. 2) has a transverse slot 18 in which the central upper portion of the cutter is positioned, and the cutter has a rectangular slot 20 which receives the shank. The shank and cutter interfit or mate snugly, and they are held together by a screw 22 threaded into a hole through one side of the shank, with the end of the screw positioned in a hole through the cutter.

The assembling of the cutter onto the shank is accomplished by inserting the cutter in slot 16 and projecting the shank downwardly into recess 14 so that the shank and cutter interfit and the holes in the cutter and shank are both in alignment with a hole 26 in cone 11. The screw is then inserted into hole 26, and turned into place in the holes in the shank and the cutter with the screw head within the cylindrical surface of the shank. When so assembled the shank and cutter may be moved axially with respect to the nose cone with limited movement. The downward movement is limited by the engagement of the bottom end of shank 4 against the bottom of recess 14 at which time the cutter is in the broken-line position of FIG. 1. The upward movement is limited by the engagement of the top edges 27 against the top of slot 16 (the full-line position of FIG. 1). Resilient sleeve 10 is positioned snugly between the top annular surface of nose cone 11 and collar 6, and holds shank 4 and cutter 12 resiliently in the rest position shown in FIG. 1. However, when the nose cone is held and force is exerted on shank 4 urging it downwardly with respect to the nose cone, sleeve 10 is compressed and the one shank and cutter move downwardly.

The drawings show the illustrative embodiment of the invention to scale and reference will be made to specific dimensions and the angular relationships of the parts of the illustrative embodiment. Referring to FIG. 6, the center plane 29 of cutter 12 extends through the axis 33 of nose cone 11 and shank 4. Cutter 12 has two identical cutting edges 30 and 32 (FIGS. 4 and 5) which are at an angle of 90° from each other and are positioned symmetrically with respect to the central axis 33 and each in leading relationship (see FIG. 6) with respect to the center plane 29 of the cutter. The cone of conical surface 13 of the nose cone has an apex angle of 58° so that the cutting edges intersect the cone of surface 13 at an angle of 16°. Cutting edge 32 has a positive rake with a surface 34 forming a relief angle of the order of 3° to 5°, and extending radially inwardly from the cutting edge is a surface 36 which is a segment of a cylinder illustratively of a radium of .125 inch extending from the side surface 37. As indicated above, cutting edge 30 is identical with cutting edge 32. Nose cone 11 has a chip ejector relief and chip breaker groove 38 in leading relationship with respect to each of the cutting edges 30 and 32. With a nose cone having its cylindrical portion of a diameter of 1⅛ inches, each of grooves 38 is formed with an arcuate-contour surface 40 at a depth 41 of ⅛ inch in the plane of the cutting edge from a center 43.

Each of the curved surfaces 40 cooperates with the adjacent surfaces 36 and 37 on the cutter to provide in effect a continuous deflecting path for chips being cut from a workpiece by the adjacent cutting edge. For example (FIG. 4) the tool is shown engaging a workpiece 44 with surface 13 of the nose cone resting on the top edge 46 of a hole or bore 48. Also, sufficient force has been exerted on shank 4 to compress collar 10 and to move cutter 12 downwardly so that its cutting edges 30 and 32 have just moved into contact with edge 46. When in this position each of the cutting edges 30 and 32 intersects the cone of surface 13 at edge 46 so that further downward movement of the cutter causes the cutting edges to start cutting the workpiece simultaneously in diametrically spaced cutting zones. Also, a portion of each surface 36 and the adjacent portion of its surface 37 extend radially inwardly and upwardly from the zone at edge 46 of the workpiece and the cutting edge. The adjacent portion of surface 40 cooperates with the cutter surfaces to deflect the chips upwardly and radially outwardly. Also, surface 13 extends into bore 48 below the lower portions of the cutting edges and the cutting edges overhang the top surface of the workpiece. Hence (see also FIG. 5), the cutting action is at the diametrically spaced zones radially outwardly and above the portion of the nose cone which projects into the original bore. The chips which are removed are generally frusto-conical with the center line of the row of chips being halfway between the momentary top edge 46 of bore 48 and the top surface 50 of the workpiece. It is thus seen in FIG. 5 that the chips are diverted upwardly and away from the cutting zone in an efficient and dependable manner. The cutting action is improved by the contour of surface 36 and this surface also aids in moving the chips upwardly and away from the cutting zone.

Cutter 12 in the illustrative embodiment has its cutting edges at an angle of 90°. However, tool 2 is provided with other cutters having cutting edges for example 82° from each other and 60° from each other. Each of these cutters has the same general contour as cutter 12 with its side faces fitting snugly within slot 16. With a cutter having its cutting edges at a lesser angle the lower end or tip of the cutter in the rest position is nearer the apex of the cone surface of the nose cone. However, with each of the cutters the angle is greater than the angle of that cone surface. In each case as the cutter is moved downwardly the top ends of its cutting edges emerge first from the top edge of the conical surface on the nose cone and upon further movement the cutting edges are exposed progressively toward the axis. Hence, for any bore within the radial dimensions of the cutting edges the work piece is cut away in the manner discussed above.

What is claimed is:

1. In a countersinking tool, the combination of, a nose cone which is adapted to be centered in a bore in a workpiece and present a supporting surface along the cone, said nose cone having a transverse slot with parallel side faces and extending from the apex toward the base of the cone, a cutter positioned within said slot and having two cutting edges which are diametrically positioned with respect to each other and extend symmetrically with respect to the axis of said cone, said cutter having a central plane which extends through said axis and said cutting edges being positioned in leading relationship with respect to said central plane, said cutter being shaped to provide a relief angle in trailing relationship and a surface extending radially inwardly which is of the nature of the surface of a cylinder, said cutting edges being at an angle to each other which is greater than the apex angle of said cone, said nose cone having a chip groove in leading relationship with respect to each of said cutting edges, and mounting means for said nose cone and said cutter resiliently urging said cutter axially away from the apex of said cone and permitting said cutter to be projected progressively from said slot with said cutting edges being exposed initially remote from said apex and progressively toward said apex.

2. A tool as described in claim 1 wherein said mounting means comprises, a central shank attached to said cutter, a collar spaced upwardly along said shank and fixed thereto, and resilient means positioned snugly between said nose cone and said collar.

3. A tool as described in claim 1 wherein said nose cone has a central recess in which the end of said shank is positioned and in which said shank and cutter are connected by a screw.

4. A tool as described in claim 1 wherein the apex angle of said cone is of the order of 58° and the angle between said cutting edges is of the order of 60° to 90°.

5. A tool as described in clam 1 wherein said chip groove has a surface transverse to the plane of said cutting edge which is a segment of a cylinder.

6. A tool as described in claim 2 wherein said nose cone has a central recess in which the end of said shank is positioned and in which said shank and cutter are connected by a screw.

7. A tool as described in claim 2 wherein the apex angle of said cone is of the order of 58° and the angle between said cutting edges is of the order of 60° to 90°.

8. A tool as described in claim 2 wherein said chip groove has a surface transverse to the plan of said cutting edge which is a segment of a cylinder.

References Cited

UNITED STATES PATENTS

| 2,187,221 | 1/1940 | Brown | 77—73 |
| 2,418,790 | 4/1947 | Peckham | 77—73.5 |

FRANCIS S. HUSAR, Primary Examiner

U.S. Cl. X.R.

77—73; 145—123